(12) United States Patent
Zengo et al.

(10) Patent No.: US 11,323,583 B2
(45) Date of Patent: May 3, 2022

(54) INFORMATION READING DEVICE AND IMAGE FORMING APPARATUS FOR APPLYING DETECTION OBJECT TO RECORDING MEDIUM ACCORDING TO DEGREE OF CONFIDENTIALITY

(71) Applicant: FUJIFILM Business Innovation Corp., Tokyo (JP)

(72) Inventors: Takeshi Zengo, Yokohama (JP); Akira Mihara, Ebina (JP); Mamoru Fujita, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/317,002

(22) Filed: May 11, 2021

(65) Prior Publication Data

US 2022/0109771 A1 Apr. 7, 2022

(30) Foreign Application Priority Data

Oct. 2, 2020 (JP) .............................. JP2020-167759

(51) Int. Cl.
*H04N 1/00* (2006.01)
(52) U.S. Cl.
CPC ..... *H04N 1/00846* (2013.01); *H04N 1/00729* (2013.01); *H04N 1/00848* (2013.01); *H04N 1/00875* (2013.01)

(58) Field of Classification Search
None
See application file for complete search history.

(56) References Cited

U.S. PATENT DOCUMENTS

| | | | |
|---|---|---|---|
| 2005/0200910 A1* | 9/2005 | Kanoshima | H04N 1/00342 358/448 |
| 2006/0274352 A1* | 12/2006 | Nakaguma | H04N 1/00342 358/1.14 |
| 2007/0157826 A1* | 7/2007 | Mestres | G03G 21/046 101/2 |
| 2010/0127838 A1* | 5/2010 | Oh | H04N 1/32138 340/10.51 |
| 2010/0259779 A1* | 10/2010 | Bellotti | G06Q 10/06 358/1.15 |
| 2016/0297175 A1* | 10/2016 | Deng | B32B 27/20 |

FOREIGN PATENT DOCUMENTS

| | | |
|---|---|---|
| JP | 2005-081748 A | 3/2005 |
| JP | 2014-113775 A | 6/2014 |

* cited by examiner

*Primary Examiner* — Miya J Williams
(74) *Attorney, Agent, or Firm* — Oliff PLC

(57) ABSTRACT

A reading device includes: a reading unit configured to read a first recording medium; and an information acquisition unit configured to acquire information related to a detection object applied to the first recording medium.

12 Claims, 9 Drawing Sheets

INFORMATION READING DEVICE AND IMAGE FORMING APPARATUS FOR APPLYING DETECTION OBJECT TO RECORDING MEDIUM ACCORDING TO DEGREE OF CONFIDENTIALITY

CROSS-REFERENCE TO RELATED APPLICATIONS

This application is based on and claims priority under 35 USC 119 from Japanese Patent Application No. 2020-167759 filed on Oct. 2, 2020.

BACKGROUND

Technical Field

The present invention relates to an information reading device and an image forming apparatus.

Related Art

JP-A-2005-81748 provides a printer apparatus that does not perform printing on a sheet other than a sheet having a predetermined condition, the printer apparatus including: a conveyance unit for conveying a sheet; a determination unit for determining whether the sheet conveyed by the conveyance unit satisfies a predetermined condition; a print unit for output information by printing on the conveyed sheet under control of a control unit; and a control unit for transmitting a signal for permitting printing to the print unit when it is determined that a determination result by the determination unit satisfies the condition.

JP-A-2014-113775 provides an image forming apparatus including: an image forming unit for forming an image on a sheet; a print image reading unit for reading an image formed on a sheet with respect to the sheet output from the image forming unit; a print image determination unit for comparing the image read by the print image reading unit with a preset output prohibited image to determine whether to permit output of the sheet output from the image forming unit; and a control unit for controlling an output operation with respect to the sheet output from the image forming unit based on a determination result of the print image determination unit. The control unit distinguishes an output operation performed under an output non-permitted determination from an output operation performed under an output permitted determination.

SUMMARY

By applying a detection object on the recording medium in a case where confidential information is printed on a recording medium such as paper, it is possible to detect that the recording medium is a recording medium printed with confidential information by detecting the detection object. However, when a recording medium such as paper printed with information is read, unless it is detected whether the detection object is present on the recording medium as the reading source, the detection object cannot be applied to the recording medium as the reading source in a case where the detection object is not applied even though confidential information is printed.

Aspects of non-limiting embodiments of the present disclosure relate to a reading device and an image forming apparatus that are capable of acquiring information related to a detection object applied to a recording medium as a reading source when reading the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device including: a reading unit configured to read a first recording medium; and an information acquisition unit configured to acquire information related to a detection object applied to the first recording medium

BRIEF DESCRIPTION OF DRAWINGS

Exemplary embodiment(s) of the present invention will be described in detail based on the following figures, wherein.

DETAILED DESCRIPTION

Figure 1:
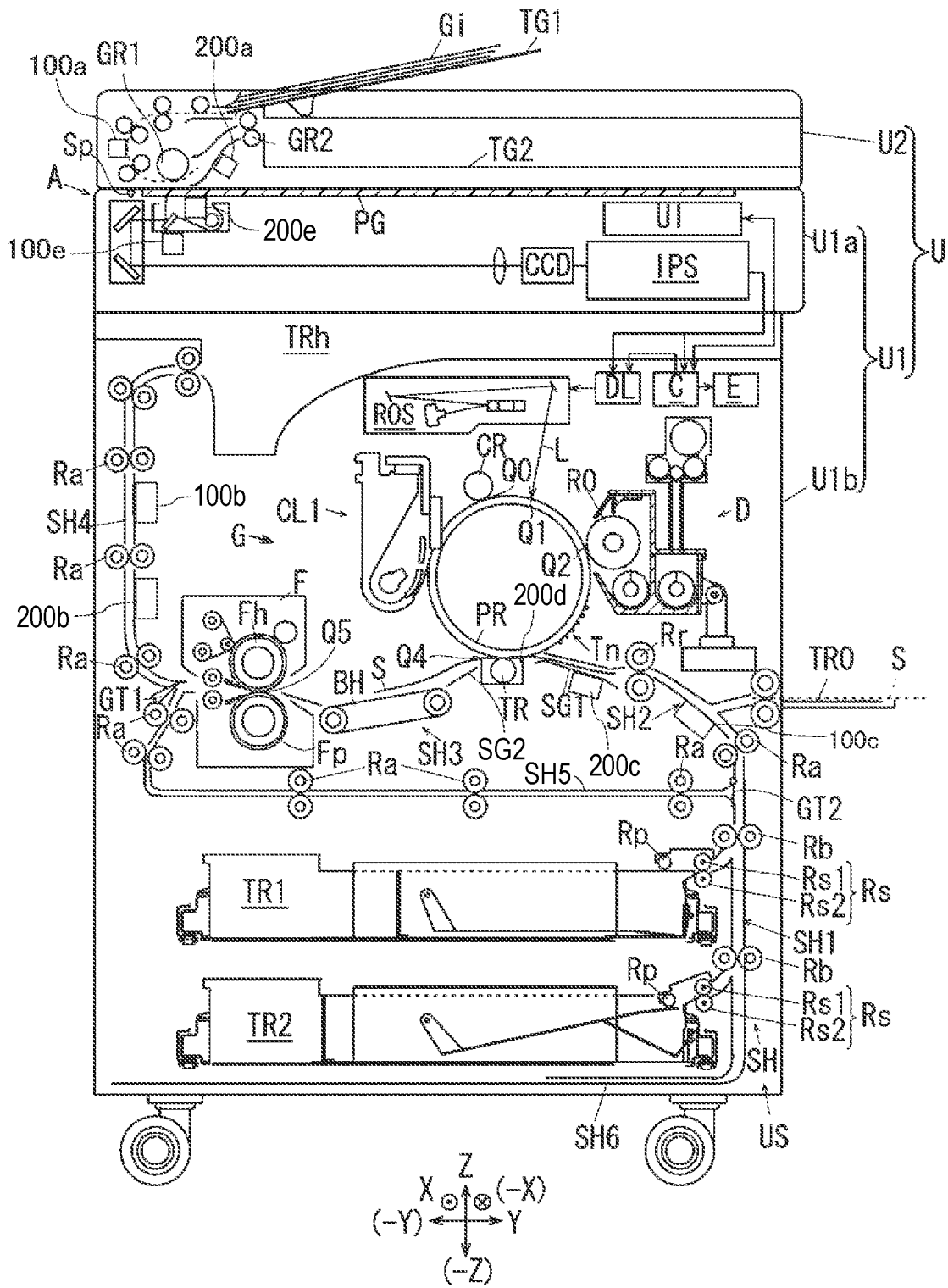
FIG. 1 is a cross-sectional view illustrating an entire image forming apparatus according to an exemplary embodiment of the present invention.

Hereinafter, an exemplary embodiment of the present invention will be described with reference to the drawings. In the drawings, the same or equivalent components and portions are denoted by the same reference numerals. In addition, dimensional ratios in the drawings are exaggerated for convenience of description, and may be different from actual ratios.

FIG. 1 is a cross-sectional view illustrating an entire image forming apparatus according to an exemplary embodiment of the present invention.

In FIG. 1, an image forming apparatus U includes a digital copier main body U1 as an example of an image forming apparatus main body whose upper surface is provided with a transparent document holder PG, that is, a so-called platen glass, and an automatic document conveyance apparatus U2 detachably mounted on the platen glass PG.

The automatic document conveyance apparatus U2 includes a document feed unit TG1 in which plural documents Gi to be copied are stacked. The documents Gi are an example of a first recording medium as a reading-source recording medium. The plural documents Gi placed on the document feed unit TG1 sequentially pass through a copy position on the platen glass PG, that is, a press-contact position of a platen roller GR1 as an example of a document conveyance member, and are discharged to a document discharge unit TG2 by a document discharge member GR2.

The copier main body U1 includes a scanner unit U1a as an example of the image reading device having the platen glass PG, and a printer unit U1b as an example of an image recording device.

The scanner unit U1a includes an exposure system position detection member disposed at a reading reference position, a so-called exposure system registration sensor Sp, and an exposure optical system A.

The exposure optical system A is controlled to move or stop based on a detection signal of the exposure system registration sensor Sp, and is normally stopped at the reading reference position.

In a case of an automatic document conveying operation in which copying is performed using the automatic document conveyance apparatus U2, the exposure optical system A exposes the documents Gi that sequentially pass through the copy position on the platen glass PG in a state in which the exposure optical system A is stopped at the reading reference position.

In a case of manual document arrangement operation in which an operator manually places the document Gi on the platen glass PG to perform copying, the exposure optical system A moves to expose and scan the documents Gi on the platen glass PG.

Reflected light from the exposed documents Gi passes through the exposure optical system A and is converged on a solid-state imaging element CCD. The solid-state imaging element CCD converts the document reflected light converged on an imaging surface thereof into an electric signal.

An image processing unit IPS converts a read image signal input from the solid-state imaging element CCD into a digital image write signal, and outputs the digital image write signal to a write drive signal output device DL of the printer unit U1b.

The write drive signal output device DL whose operation timing is controlled by a control unit C of the printer unit U1b outputs a write drive signal corresponding to the input image data to a latent image writing device ROS.

An image carrier PR as an example of a cleaning object disposed below the latent image writing device ROS rotates. A surface of the image carrier PR is charged by a charging roller CR as an example of a charging device in a charging region Q0, and then exposed to and scanned by a laser beam L as an example of a latent image writing light of the latent image writing device ROS at a latent image writing position Q1 to form an electrostatic latent image. The surface of the image carrier PR formed with the electrostatic latent image is rotationally moved to sequentially pass through a developing region Q2 and a transfer region Q4.

A developing device D that develops the electrostatic latent image in the developing region Q2 conveys a developer to the developing region Q2 by a developing roller R0, and develops the electrostatic latent image on the image carrier PR passing through the developing region Q2 into a toner image Tn as an example of a visible image.

A transfer roller TR as an example of a transfer device facing the image carrier PR in the transfer region Q4 is a member that transfers the toner image Tn on the surface of the image carrier PR to a sheet S as an example of a second recording medium. A transfer voltage having a polarity opposite to a charging polarity of the toner for development used in the developing device D is supplied to the transfer roller TR from a power supply circuit E. The power supply circuit E that applies voltages such as a charging voltage applied to the charging roller CR, a developing voltage applied to the developing roller R0, and a transfer voltage applied to the transfer roller TR, and that has a heater power supply for heating a heater of a heating roller of the fixing device F described later, and the like is controlled by the control unit C.

A first sheet feed tray TR1 and a second sheet feed tray TR2 as examples of sheet feed containers are vertically arranged in a lower portion of the copier main body U1. A pickup roller Rp as an example of a sheet ejection member is disposed at an upper end portion of a right end portion of each of the first sheet feed tray TR1 and the second sheet feed tray TR2, and the sheet S ejected by the pickup roller Rp is conveyed to a loosening member Rs.

Each loosening member Rs includes a feed roller Rs1 as an example of a sheet feed member and a retard roller Rs2 as an example of a separation member, which are pressed against each other. Sheets conveyed to a nip portion are separated one by one by the loosening member Rs and conveyed to a sheet conveyance path SH1 as an example of a medium conveyance path.

A conveyance roller Rb as an example of a conveyance member capable of forward and reverse rotation is disposed in the sheet conveyance path SH1. The sheet S conveyed to the sheet conveyance path SH1 is conveyed above to a pre-transfer sheet conveyance path SH2 by the conveyance roller Rb capable of forward and reverse rotation.

The sheet S conveyed to the pre-transfer sheet conveyance path SH2 is conveyed by the conveyance roller Ra to a registration roller Rr as an example of a transfer region conveyance timing adjustment member.

A sheet S fed from a manual sheet feed tray TR0 as an example of a manual sheet feed unit is also conveyed to the registration roller Rr.

The sheet S conveyed to the registration roller Rr is conveyed from a pre-transfer sheet guide SG1 as an example of a pre-transfer medium guiding member to the transfer region Q4 at a timing when the toner image Tn on the image carrier PR moves to the transfer region Q4.

The toner image Tn developed on the surface of the image carrier PR is transferred to the sheet S by the transfer roller TR in the transfer region Q4. After the transfer, the surface of the image carrier PR is cleaned by a cleaner CL1 as an example of a cleaning device, so that residual toner as an example of an attached matter is removed, and the surface of the image carrier PR is re-charged by the charging roller CR.

The image carrier PR, the charging roller CR, the latent image writing device ROS, the developing device D, and the like constitute a toner image forming device G (PR+CR+ROS+D).

A post-transfer sheet conveyance path SH3 for conveying a recorded sheet S on which the toner image Tn is recorded in the transfer region Q4 to a fixing region Q5 is provided on a downstream side in a sheet conveyance direction of the transfer region Q4. The sheet S to which the toner image is transferred by the transfer roller TR in the transfer region Q4 is peeled from the surface of the image carrier PR, guided by a sheet guide SG2 as an example of a post-transfer medium guiding member of the post-transfer sheet conveyance path SH3, and conveyed to a fixing device F by a sheet conveyance belt BH as an example of a post-transfer medium conveyance member.

The fixing device F includes a heating roller Fh as an example of a heat fixing member including a heater therein as a heat source, and a pressure roller Fp as an example of a pressure fixing member. After the toner image is heated and fixed when the sheet S conveyed to the fixing device F passes through the fixing region Q5, which is formed by a pressure contact region between the heating roller Fh and the pressure roller Fp, the sheet S is conveyed to a sheet discharge tray TRh as an example of a medium discharge unit through a sheet discharge path SH4.

A switching gate GT1 as an example of a conveyance path switching member is disposed on a downstream side of the fixing device F in the sheet discharge path SH4. The switching gate GT1 switches a conveyance direction of the sheet S that passes through the fixing device F toward either the sheet discharge tray TRh side or a sheet flipping connection path SH5. The sheet flipping connection path SH5 connects an upstream end of the sheet discharge path SH4, that is, a downstream portion of the fixing device F, and the sheet conveyance path SH1 in an upper-lower direction.

In a case of double-sided copying, a single-side recorded sheet S on which the toner image of a first side is recorded is conveyed to the sheet flipping connection path SH5 by the switching gate GT1, passes through a Mylar gate GT2 as an example of a transport direction regulating member, and is conveyed to a sheet flipping path SH6 by reverse rotation of the conveyance roller Rb capable of forward and reverse rotation. The sheet S conveyed to the sheet flipping path SH6 is conveyed in a reverse direction, that is, switched back, by forward rotation of the conveyance roller Rb capable of forward and reverse rotation, and is re-conveyed to the transfer region Q4 in a flipped state.

A sheet conveyance path SH as an example of a medium conveyance path is constituted by the elements SH1 to SH6.

A sheet conveyance apparatus US as an example of a medium conveyance apparatus is constituted by the sheet conveyance path SH and the rollers Ra, Rb, and Rr which have a sheet conveying function are disposed in the sheet conveyance path SH.

The image forming apparatus U illustrated in FIG. 1 includes an information acquisition unit 100a and detection object application units 200a and 200b. The information acquisition unit 100a and the detection object application unit 200a are provided inside the automatic document conveyance apparatus U2. The detection object application unit 200b is provided inside the printer unit U1b. The information acquisition unit 100a reads the document Gi, and when the information acquisition unit 100a detects that the detection object is applied to the document Gi, the information acquisition unit 100a acquires information related to the detection object applied to the document Gi. The detection object is a substance that causes the image forming apparatus U to detect that the document Gi is a medium different from normal paper. The detection object is, for example, attached to the surface of the document Gi, and is made of a substance whose presence is detectable in a non-contact manner. Examples of the substance that is detectable in a non-contact manner include a volatile material. By attaching the volatile material to the surface of the document Gi, a volatile gas is generated from the document Gi. When the information acquisition unit 100a detects the volatile gas generated from the document Gi, the information acquisition unit 100a acquires that the volatile material is attached to the document Gi as the information related to the detection object.

Examples of the substance that is detectable in a non-contact manner include a material that reflects or absorbs radio waves. As the material that reflects or absorbs radio waves, a material that reflects or absorbs at least a part of radio waves having a frequency of 1 GHz or more and 5 THz or less is used. As the material for reflecting or absorbing radio waves, any conductive material, dielectric material, or magnetic material may be used. By attaching the material for reflecting or absorbing the radio wave to the surface of the document Gi, the information acquisition unit 100a may acquire that the material for reflecting or absorbing the radio wave is attached to the document Gi from the reflection state of the radio wave as the information related to the detection object.

The substance that is detectable in a non-contact manner is, for example, a material that generates a magnetic force. By attaching the material that generates a magnetic force, for example, a magnetic material, to the surface of the document Gi, the information acquisition unit 100a may detect the magnetic force to acquire that the material that generates a magnetic force is attached to the document Gi as the information related to the detection object.

Figure 9:
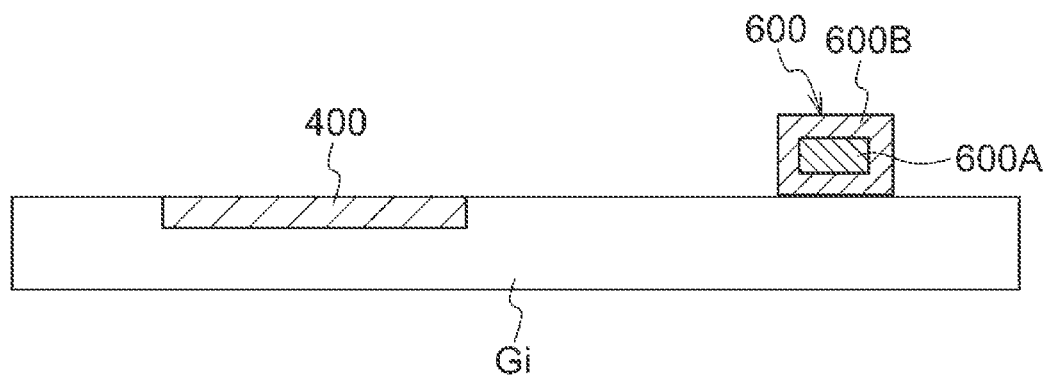
FIG. 9 is a cross-sectional view illustrating an example of a state in which a material that generates magnetic force is attached to a document.

FIG. 9 is a cross-sectional view illustrating an example of a state in which the material that generates a magnetic force is attached to the document Gi. In FIG. 9, a structure 600 is attached to the surface of the document Gi by a pressure-sensitive adhesive, an adhesive, or the like. The structure 600 includes, for example, a magnetic body 600A and a protective layer 600B covering a periphery of the magnetic body 600A. As described above, since the material that generates the magnetic force is attached to the surface of the document Gi, it is possible to detect the document Gi by a magnetic sensor.

As described above, there are various substances to be applied to the document Gi as the detection object. Therefore, the information acquisition unit 100a includes a sensor capable of detecting the detection object applied to the document Gi. In a case where the volatile gas is attached to the document Gi, the information acquisition unit 100a includes a gas sensor capable of detecting gas. In a case where the material that reflects or absorbs radio waves is attached to the document Gi, the information acquisition unit 100a includes, as sensors, a transmission antenna that transmits radio waves and a reception antenna that receives radio waves. In a case where the material that generates a magnetic force is attached to the document Gi, the information acquisition unit 100a includes, as a sensor, a magnetic sensor that detects a magnetic force. As the magnetic sensor, for example, a device capable of detecting magnetism such as a coil, a Hall element, a magnetoresistive effect element, or the like may be used.

Figure 10:
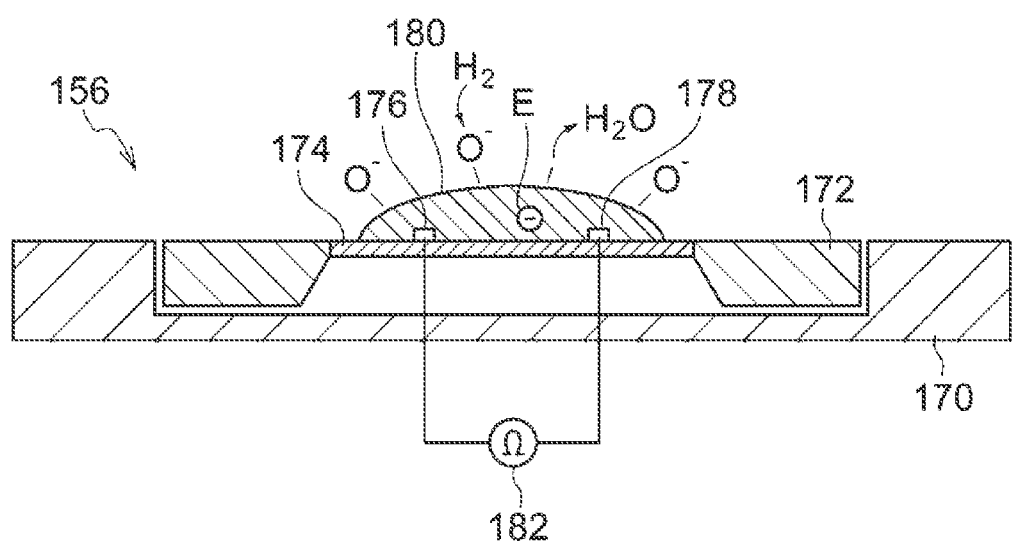
FIG. 10 is a diagram illustrating a configuration example of a sensor that functions as an example of an information acquisition unit.

A specific example of the information acquisition unit 100a will be described. FIG. 10 is a diagram illustrating a configuration example of a sensor 156 that functions as an example of the information acquisition unit 100a. The sensor 156 shown in FIG. 10 is a gas sensor of a metal oxide type. The sensor 156 includes a case 170, a support portion 172 provided in the case 170, a plate 174 supported by the support portion 172, and plural electrodes 176 and 178 provided on the plate 174. The support portion 172 is made of silicon. The plate 174 is heated to a predetermined temperature. The sensor 156 includes a metal oxide layer 180 that is provided on the plate 174 so as to cover the electrodes 176 and 178, and a resistance measurement unit 182 that measures a resistance value between the electrodes 176 and 178.

In the sensor 156, for example, oxygen in the air traps electrons of the metal oxide layer 180 and becomes negative ions O⁻ on a surface of the metal oxide layer 180 to be adsorbed. When a reducing gas is present in the vicinity of the metal oxide layer 180, the negative ions O⁻ on the surface of the metal oxide layer 180 react with the reducing gas (for example, react with hydrogen in the reducing gas and become water), and electrons E are movable in the metal oxide layer 180. As a result, the resistance value measured by the resistance measurement unit 182 changes. For example, when a concentration of the volatile gas generated from the document Gi is high, at least a part of the volatile gas reacts with the negative ions O⁻ on the surface of the metal oxide layer 180, so that the electrons E in the metal oxide layer 180 increase. Therefore, by measuring the resistance value between the electrodes 176 and 178 by the resistance measurement unit 182, it is possible to detect the gas applied to the document Gi.

Figure 11:
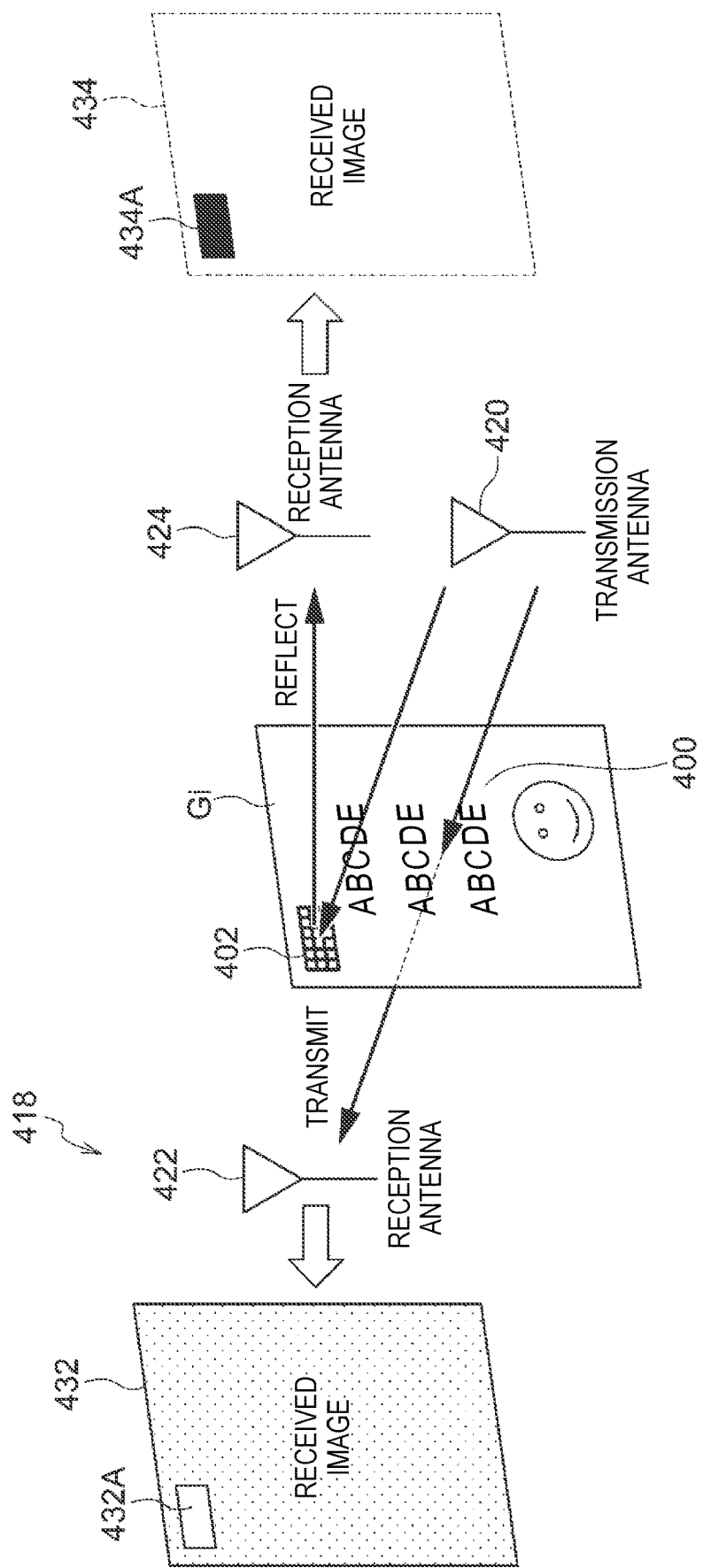
FIG. 11 is a diagram illustrating a specific example of a detection device that functions as an example of the information acquisition unit.

Another specific example of the information acquisition unit 100a will be described. FIG. 11 is a diagram illustrating a specific example of a detection device 418 that functions as an example of the information acquisition unit 100a. The detection device 418 includes a transmission antenna 420 that transmits radio waves and a reception antenna 422 that receives radio waves. The transmission antenna 420 and the reception antenna 422 are disposed on both sides of a position through which the document Gi passes. The transmission antenna 420 and the reception antenna 422 are provided on both sides of the conveyance path of the document Gi, for example.

In the detection device 418, the transmission antenna 420 transmits radio waves having a frequency of 1 GHz or more and 5 THz or less to a printed matter. The reception antenna 422 receives radio waves transmitted from the transmission antenna 420 to detect reflection or absorption of radio waves. In an example of the exemplary embodiment of the present invention, the radio waves transmitted from the transmission antenna 420 are millimeter waves. Plural transmission antennas 420 and plural reception antennas 422 may be provided, and the plural transmission antennas 420 and reception antennas 422 may be provided on different planes. In the detection device 418, instead of the reception antenna 422, a reception antenna 424 that receives radio waves may be disposed on the same side as the transmission antenna 420 that transmits radio waves to the document Gi.

The detection device 418 may detect that an image having a high degree of confidentiality is formed on the document Gi by the transmission antenna 420 transmitting radio waves and the reception antenna 422 receiving radio waves. That is, by forming a detection image 402 in addition to a normal image 400 on the surface of the document Gi, the detection device 418 may detect the detection image 402 of the document Gi in a non-contact manner by the transmission antenna 420 and the reception antenna 422. In a case where the detection image 402 is formed on the document Gi, most of the radio waves pass (that is, are transmitted) through a portion of the document Gi that is formed with the image 400, but at least a part of the radio wave is reflected or absorbed by the detection image 402. In the example illustrated in FIG. 11, the detection image 402 is a detection image that reflects at least a part of radio waves. In this case, most of the radio waves transmitted from the transmission antenna 420 pass through the portion of the document Gi formed with the image 400, but at least a part of the radio waves are reflected by the detection image 402. As a result, a reception image 434 acquired by the reception antenna 422 is an image in which a portion 434A of the document Gi where the detection image 402 is missing. Therefore, it is possible to detect the document Gi formed with the detection image 402 by the reception antenna 422.

When information falling into confidential information is printed on the document Gi and the information acquisition unit 100a cannot acquire information related to the detection object, the detection object application unit 200a applies the detection object to the document Gi. When information falling into confidential information is printed on the document Gi and the information acquisition unit 100a acquires information related to the detection object, the detection object application unit 200a does not apply the detection object to the document Gi. When information falling into confidential information is not printed on the document Gi, the detection object application unit 200a does not apply the detection object to the document Gi.

Whether information falling into confidential information is printed on the document Gi is determined by analyzing a read image signal input from the solid-state imaging element CCD using optical character recognition (OCR). Whether or not confidential information is printed on the document Gi may be determined depending on, for example, presence or absence of a predetermined keyword, presence or absence of a previously registered confidential image, similarity of wording or format, detection of a telephone number or the like by a regular expression, or the like.

When confidential information is printed on the document Gi, the detection object application unit 200b applies the detection object to the conveyed sheet S. In a case where confidential information is not printed on the document Gi, the detection object application unit 200b does not apply the detection object to the document Gi.

The detection object application units 200a and 200b apply a substance that is detectable in a non-contact manner as the detection object to the surfaces of the document Gi and the sheet S. For example, the detection object application units 200a and 200b apply a volatile material as the detection object to the document Gi and the sheet S. The volatile material applied to the document Gi and the sheet S may be odorless to humans in a volatilized state or of a concentration that cannot be recognized by smell sense of humans in a volatilized state. Examples of the volatile material odorless to humans include an organic compound containing a hydroxyl group or a hydroxyl group and an ether group. Examples of these organic compounds include alcohols, glycols, and glycol ethers.

As the odorless volatile material, examples of glycols include ethylene glycol, diethylene glycol, propylene glycol, 1,3-butanediol, and triethylene glycol. Examples of the alcohols include glycerin. Examples of the glycol ethers include methyl carbitol, ethyl carbitol, butyl carbitol, and propylene glycol monomethyl ether. In addition, examples of those containing ether group and alcohol group include tert-butyl cellosolve and Solfit.

As a method for evaluating odorlessness, a six-step odor intensity scale may be used. In the six-step odor intensity scale, scale 0 or 1 is defined as odorless. It is desirable that the evaluation is performed by a person qualified as odor determiner. A concentration at which the scale is 0 or 1 is a concentration that cannot by detected by human sense of smell. In addition, it is desirable to use a volatile material that is confirmed as safe in a known safety evaluation.

The material constituting the detection object of the present exemplary embodiment may contain two or more types of organic compounds. It may also be possible to add features of the organic compounds to the detection object application units 200a and 200b respectively by containing two or more types of organic compounds, for example. For example, in order to sustain the generation of the volatile gas, two or more types of organic compounds having different volatilization rates may be contained.

As illustrated in FIG. 1, the image forming apparatus U detects the detection object applied to the document Gi by the information acquisition unit 100a, but may also convey the document Gi to the printer unit U1b and detect the detection object applied to the document Gi by the information acquisition unit 100b. In addition, a case may be considered in which a detection object is also applied previously to the sheet S conveyed from the first sheet feed tray TR1 and the second sheet feed tray TR2. Therefore, the detection object applied to the sheet S may be detected by the information acquisition unit 100c. In addition, an information acquisition unit 100e may be provided inside the scanner unit U1a, and the information acquisition unit 100e provided inside the scanner unit U1a may detect the detection object applied to the document Gi.

In FIG. 1, the image forming apparatus U applies the detection object to the sheet S by the detection object application unit 200c, but may also apply the detection object to the sheet S by a detection object application unit 200b or 200d. In addition, a detection object application unit 200e may be provided inside the scanner unit U1a, and the detection object may be applied to the document Gi by the detection object application unit 200e included in the scanner unit U1a.

Figure 2:
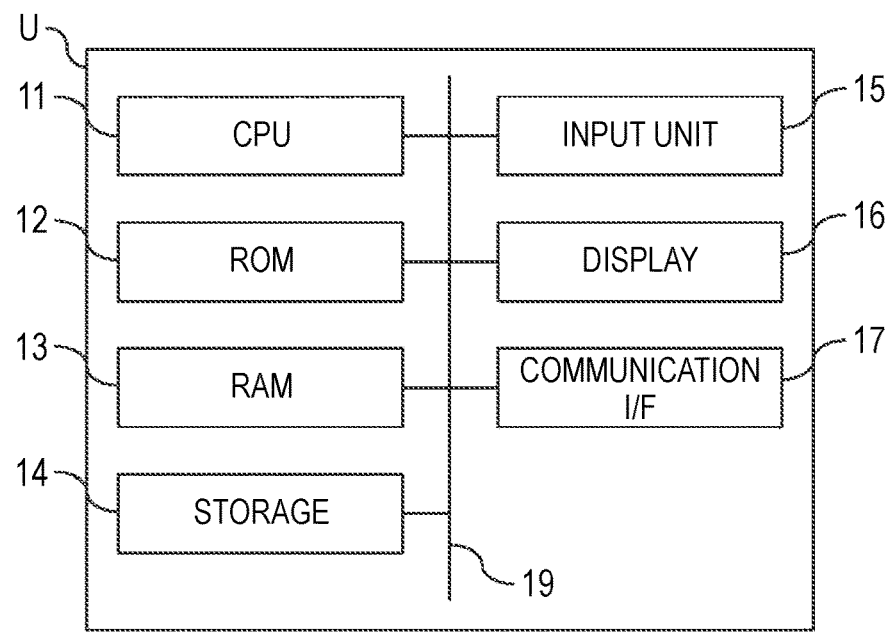
FIG. 2 is a block diagram illustrating a hardware configuration of the image forming apparatus.

FIG. 2 is a block diagram illustrating a hardware configuration of the image forming apparatus U.

As illustrated in FIG. 2, the image forming apparatus U includes a central processing unit (CPU) 11, a read only memory (ROM) 12, a random access memory (RAM) 13, a storage 14, an input unit 15, a display 16, and a communication interface (I/F) 17. The respective components are connected to each other via a bus 19 so as to be able to communicate with each other.

The CPU 11 is a central arithmetic processing unit, and executes various programs and controls each unit. That is, the CPU 11 reads the program from the ROM 12 or the storage 14, and executes the programs using the RAM 13 as a work area. The CPU 11 controls the above components and performs various types of arithmetic processing in accordance with the programs recorded in the ROM 12 or the storage 14. In the present exemplary embodiment, the ROM 12 or the storage 14 stores a confidential information processing program for detecting presence or absence of printing of confidential information on the document Gi and applying the detection object to the document Gi or the sheet depending on the presence or absence of confidential information.

The ROM 12 stores various programs and various data. The RAM 13 temporarily stores programs or data as a work area. The storage 14 is configured with a storage device such as a hard disk drive (HDD), a solid state drive (SSD), or a flash memory, and stores various programs including an operating system and various data.

The input unit 15 includes a pointing device such as a mouse and a keyboard, and is used to perform various inputs.

The display 16 is, for example, a liquid crystal display, and displays various information. The display 16 may function as the input unit 15 by employing a touch panel method.

The communication interface 17 is an interface for communicating with other devices, and is, for example, a standard such as Ethernet (registered trademark), FDDI, or Wi-Fi (registered trademark).

When the confidential information processing program is executed, the image forming apparatus U realizes various functions using the above-described hardware resources. A functional configuration implemented by the image forming apparatus U will be described.

Next, a functional configuration of the image forming apparatus U will be described.

Figure 3:
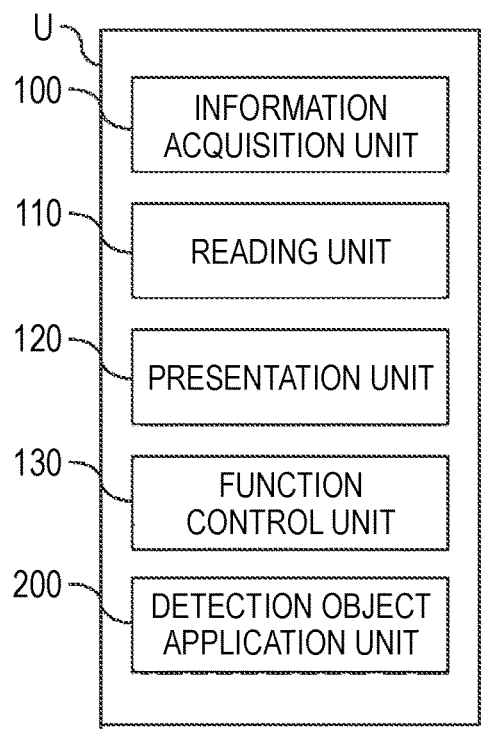
FIG. 3 is a block diagram illustrating an example of a functional configuration of the image forming apparatus.

FIG. 3 is a block diagram illustrating an example of the functional configuration of the image forming apparatus U.

As illustrated in FIG. 3, the image forming apparatus U includes, as the functional configuration, an information acquisition unit 100, a reading unit 110, a presentation unit 120, a function control unit 130, and a detection object application unit 200.

As described above, when the information acquisition unit 100 detects that the detection object is applied to the document Gi read by the reading unit 110, the information acquisition unit 100 acquires information related to the detection object applied to the document Gi. The detection object is attached to the surface of the document Gi, and is made of a substance whose presence is detectable in a non-contact manner.

The reading unit 110 reads the document Gi. The reading unit 110 determines whether a content falling into confidential information is printed on the read documents Gi. In a case where a content falling into confidential information is printed on the document Gi read by the reading unit 110, the detection object application unit 200 applies the detection object to the document Gi and the sheet S to which the detection object is not applied. The reading unit 110 determines whether or not confidential information is printed on the document Gi depending on, for example, presence or absence of a predetermined keyword, presence or absence of a previously registered confidential image, similarity of wording or format, detection of a telephone number or the like by a regular expression, or the like.

The presentation unit 120 presents the information related to the detection object acquired by the information acquisition unit 100. For example, when the detection object is applied to the document Gi, the presentation unit 120 presents a subject that the detection object is applied to the document Gi and the content of the applied detection object.

The function control unit 130 controls execution of the function of the image forming apparatus U when the content read by the reading unit 110 includes confidential information. For example, the function control unit 130 limits some of the functions included in the image forming apparatus U and/or controls the function to execute specific processing when the content read by the reading unit 110 includes confidential information. Examples of usage control performed by the function control unit 130 include prohibition of a printing function, prohibition of a facsimile function, prohibition of a scanning function, movement of the document Gi to the sheet discharge tray, and the like, but is not limited to these controls.

The detection object application unit 200 applies a substance that is detectable in a non-contact manner as the detection object to the surfaces of the document Gi and the sheet S. The detection object that is detectable by the information acquisition unit 100 and the detection object that is applied by the detection object application unit 200 may be the same substance or different substances.

The detection object application unit 200 has only to apply the detection object to the document Gi and the sheet S, and the image forming method is not limited. The image forming method of the detection object application unit 200 may be selected from, for example, an electrophotographic method, a liquid droplet discharging method such as inkjet, a stamping method, a method system, and a silk printing method.

The detection object application unit 200 may apply the detection object to at least a part of the surfaces of the document Gi and the sheet S when applying the detection object to the document Gi and the sheet S.

As described above, it is controlled whether the detection object is to be applied to the document Gi by the detection object application unit 200 based on whether the detection object is applied to the document Gi and whether a content falling into confidential information is printed on the document Gi.

CPU 11 may select the detection object to be applied by the detection object application unit 200 according to the degree of confidentiality of the document Gi. For example, the detection object application unit 200 may select at least one of a material that generates a magnetic force, a material that absorbs or reflects at least a part of radio waves, or a volatile material according to the degree of confidentiality of the document Gi, and apply the selected material to the document Gi as the detection object. Specifically, when the degree of confidentiality of the document Gi is defined by plural levels, the detection object application unit 200 may apply a material that generates a magnetic force to a document Gi having a highest degree of confidentiality. Then, the detection object application unit 200 may apply at least one of a material that absorbs or reflects at least a part of radio waves or a volatile material to a document Gi whose degree of confidentiality is second from the top. This is because a material that generates magnetic force has better detection accuracy than other materials. In this way, by selecting the detection object to be applied in accordance with the degree of confidentiality of the document Gi, a detection accuracy of the document Gi is a detection accuracy according to the degree of confidentiality of the document Gi.

The detection object application unit 200 may apply plural types of materials as the detection object in accordance with the degree of confidentiality of the document Gi. Specifically, when the degree of confidentiality of the document Gi is defined by plural levels, the detection object application unit 200 may apply plural types of materials to a document Gi having a highest degree of confidentiality. Further, the detection object application unit 200 may apply only one type of material as the detection object to a document Gi whose degree of confidentiality is second from the top. By applying plural types of materials as the detection object, it may be possible to improve the detection accuracy of the detection object applied to the document Gi as compared with a case where one type of material is applied as the detection object.

Next, an effect of the image forming apparatus U will be described.

Figure 4:
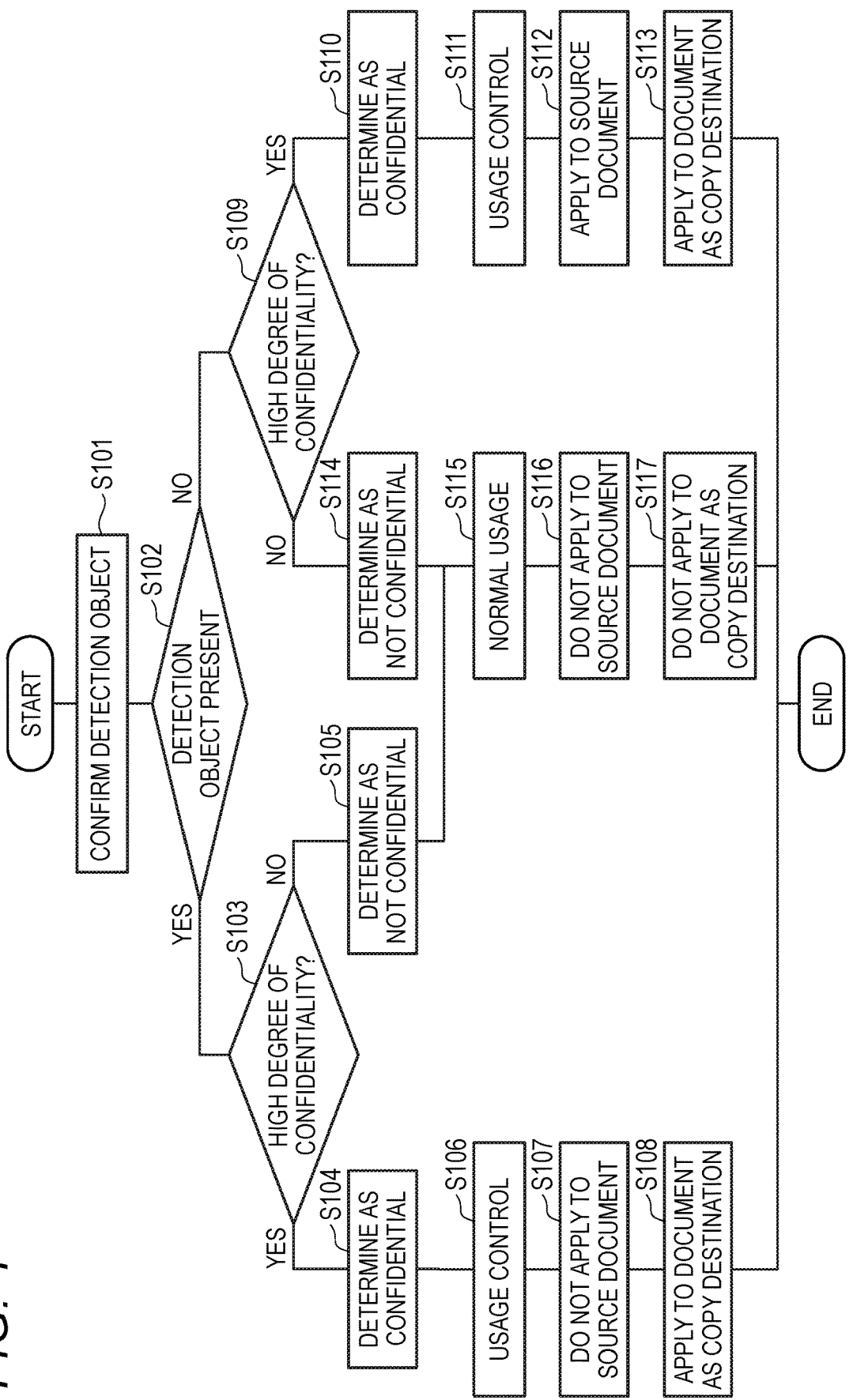
FIG. 4 is a flowchart showing a flow of confidential information processing by the image forming apparatus.

FIG. 4 is a flowchart showing a flow of confidential information processing by the image forming apparatus U. The CPU 11 reads the confidential information processing program from the ROM 12 or the storage 14, loads the information recording program into the RAM 13, and executes the program, thereby performing the confidential information processing.

When the scanner unit U1a of the image forming apparatus U reads the document Gi, the CPU 11 checks whether the detection object is present on the document Gi (step S101).

Subsequent to step S101, the CPU 11 determines whether the detection object is present on the read documents Gi (step S102).

As a result of the determination in step S102, in a case where the detection object is on the document Gi (step S102; Yes), the CPU 11 determines whether the degree of confidentiality of the read documents Gi is high (step S103). The CPU 11 determines whether the degree of confidentiality of the document Gi is high based on whether a content falling into confidential information is included. The CPU 11 determines whether or not confidential information is printed on the document Gi depending on, for example, presence or absence of a predetermined keyword, presence or absence of a previously registered confidential image, similarity of wording or format, detection of a telephone number or the like by a regular expression, or the like. The CPU 11 determines that the degree of confidentiality is high in a case where a content falling into confidential information is included in the document Gi, and determines that the degree of confidentiality is not high in a case where a content falling into confidential information is not included in the document Gi.

As a result of the determination in step S103, in a case where the degree of confidentiality of the document Gi is high (step S103; Yes), the CPU 11 determines that the document Gi is confidential (step S104). On the other hand, as a result of the determination in step S103, in a case where the degree of confidentiality of the document Gi is not high (step S103; No), the CPU 11 determines that the document Gi is not confidential (step S105).

In a case where it is determined that the document Gi is confidential (step S104), the CPU 11 performs usage control on the image forming apparatus U (step S106). The usage control with respect to the image forming apparatus U includes, for example, limiting some of the functions provided with the image forming apparatus U and/or controlling the function to execute specific processing. Examples of usage control performed by the CPU 11 include prohibition of a printing function, prohibition of a facsimile function, prohibition of a scanning function, movement of the document Gi to the sheet discharge tray, and the like, but is not limited to these controls.

Subsequent to step S106, the CPU 11 does not apply the detection object to the document Gi (step S107), and causes the detection object application unit 200 to apply the detection object to the sheet S that is a document as a copy destination (step S108). When the detection object is on the document Gi and the degree of confidentiality of the document Gi is high, the CPU 11 may control to not perform copying on the sheet S.

As the result of the determination in step S102, in a case where the detection object is not on the document Gi (step S102; No), the CPU 11 determines whether the degree of confidentiality of the read documents Gi is high (step S109).

As a result of the determination in step S109, in a case where the degree of confidentiality of the document Gi is high (step S109; Yes), the CPU 11 determines that the document Gi is confidential (step S110). Then, the CPU 11 performs usage control on the image forming apparatus U (step S111). Even though the degree of confidentiality of the document Gi is high, the detection object is not applied to the document Gi, but since the degree of confidentiality of the document Gi is high, the CPU 11 causes the detection object application unit 200 to apply the detection object to the document Gi (step S112). Further, the CPU 11 causes the detection object application unit 200 to apply the detection object to the sheet S that is a document as a copy destination (step S113).

On the other hand, as a result of the determination in step S109, in a case where the degree of confidentiality of the document Gi is not high (step S109; No), the CPU 11 determines that the document Gi is not confidential (step S114). In a case where it is determined that the document Gi is not confidential (step S105 or step S114), the CPU 11 causes the image forming apparatus U to be normally used without performing usage control of the image forming apparatus U (step S115). Subsequent to step S115, since the degree of confidentiality of the document Gi is not high, the CPU 11 does not apply the detection object to the document Gi (step S116). Further, since the degree of confidentiality of the document Gi is not high, the CPU 11 does not apply the detection object to the sheet S that is a document as a copy destination (step S117).

The CPU 11 may detect presence of confidential information applied to the recording medium by executing the series of processes shown in FIG. 4. Further, by executing the series of processes shown in FIG. 4, the CPU 11 may determine presence or absence of the detection object applied to the recording medium as a copy destination depending on whether the recording medium is confidential.

The outline of examples of the confidential information processing by the image forming apparatus U will be described with reference to the drawings.

Figure 5:
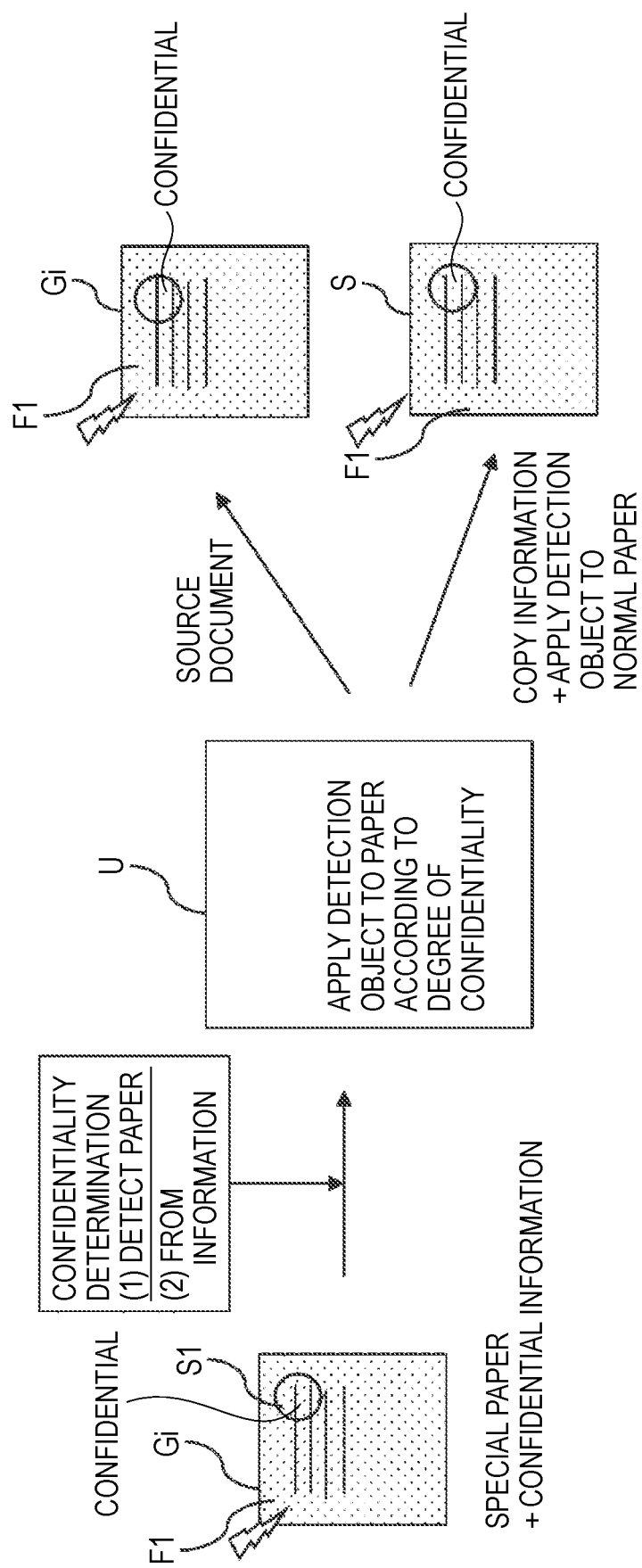
FIG. 5 is a diagram illustrating an outline of the confidential information processing performed by the image forming apparatus.

FIG. 5 is a diagram illustrating the outline of the confidential information processing performed by the image forming apparatus U. FIG. 5 illustrates an example in which the document Gi, which is a special paper applied with a detection object F1 and printed with confidential information 51, is copied by the image forming apparatus U.

In a case where the detection object F1 is applied to the document Gi, the image forming apparatus U outputs the sheet S to which the detection object F1 is applied at the time of copying the document Gi. By applying the detection object F1 to the sheet S at the time of copying the document Gi and outputting the sheet S, the image forming apparatus U may give the sheet S a confidentiality equivalent to that of the document Gi as a copy source.

Figure 6:
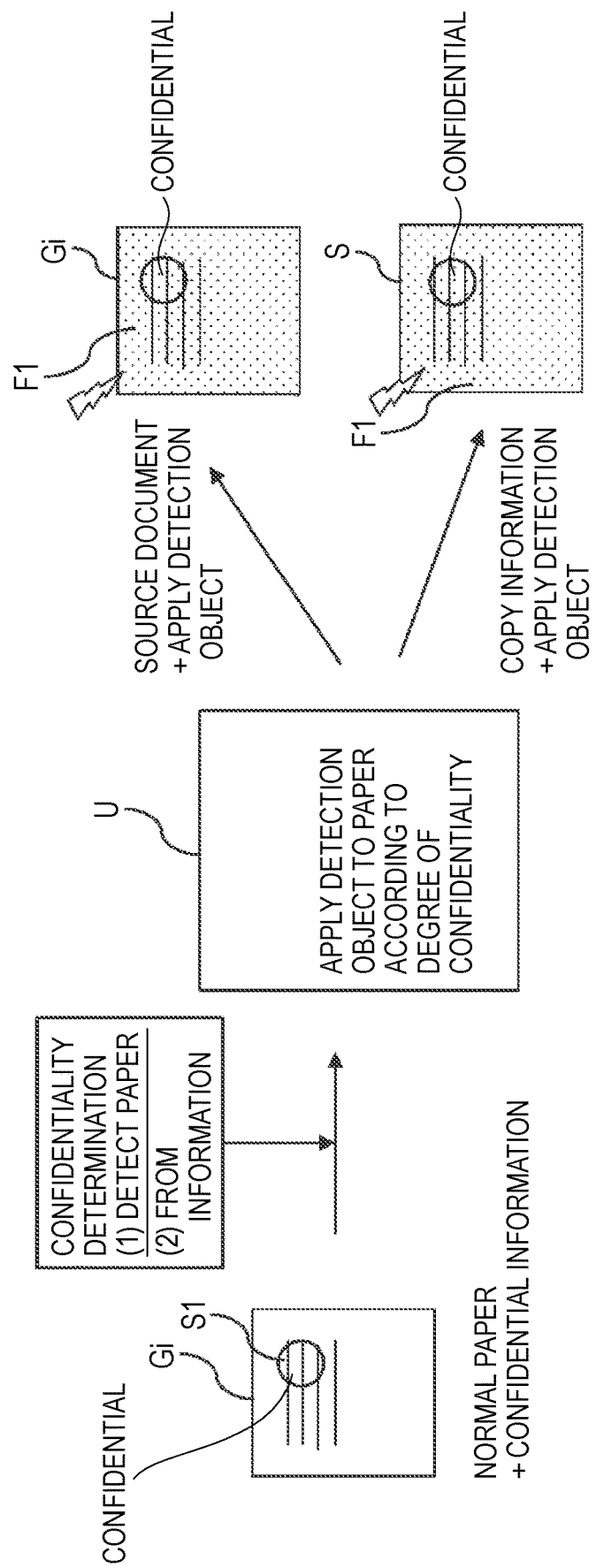
FIG. 6 is a diagram illustrating an outline of the confidential information processing performed by the image forming apparatus.

FIG. 6 is a diagram illustrating the outline of the confidential information processing performed by the image forming apparatus U. FIG. 6 illustrates an example in which the document Gi, which is a normal paper without being applied with the detection object F1 and is printed with the confidential information Si, is copied by the image forming apparatus U.

In a case where the detection object F1 is not applied to the document Gi but the confidential information Si is printed on the document Gi, at the time of copying the document Gi, the image forming apparatus U not only applies the detection object F1 to the sheet S and outputs the sheet S, but also applies the detection object F1 to the document Gi. By applying the detection object F1 to not only the sheet S but also the document Gi at the time of copying the document Gi and outputting them, the image forming apparatus U may raise the confidentiality of the document Gi as a copy source.

Figure 7:
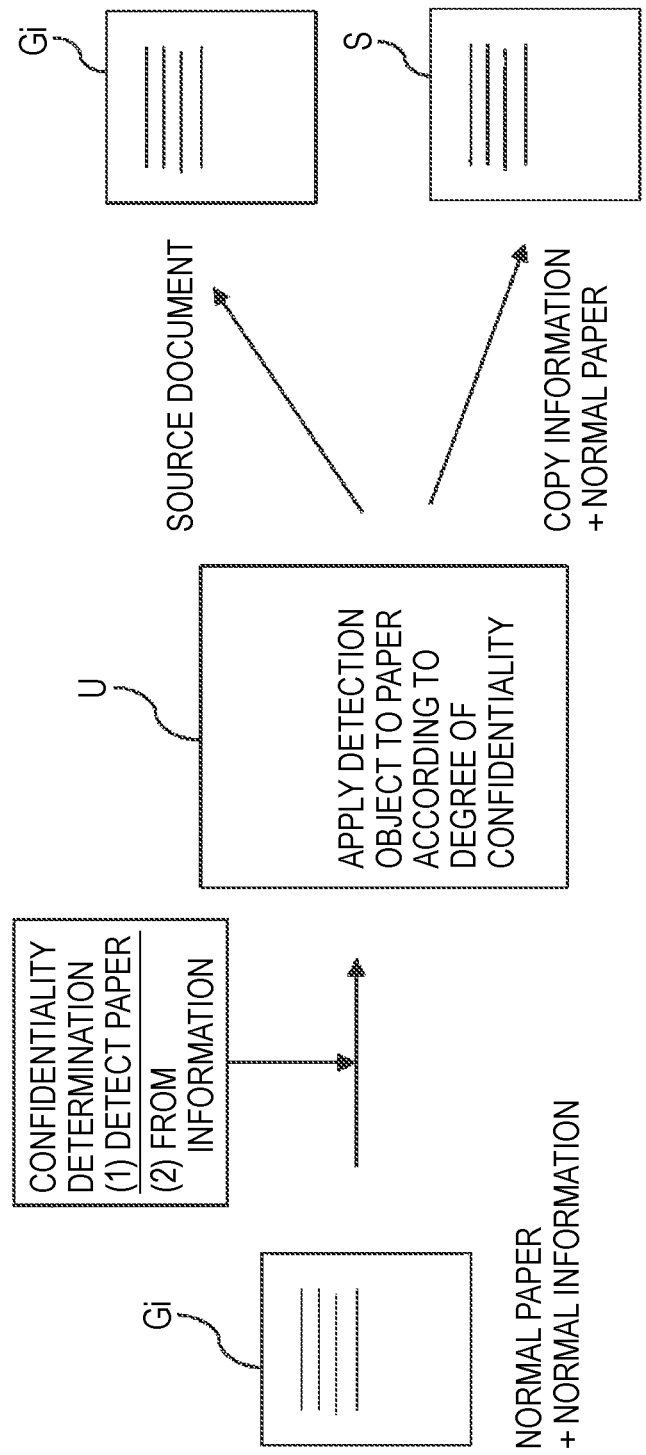
FIG. 7 is a diagram illustrating an outline of the confidential information processing performed by the image forming apparatus.

FIG. 7 is a diagram illustrating the outline of the confidential information processing performed by the image forming apparatus U. FIG. 7 illustrates an example in which the document Gi, which is a normal paper without being applied with the detection object F1 and is not printed with information falling into confidential information, is copied by the image forming apparatus U.

In a case where the detection object F1 is not applied to the document Gi and the confidential information 51 is not printed on the document Gi, the image forming apparatus U directly copies the content of the document Gi onto the sheet S. The image forming apparatus U does not apply the detection object to either the sheet S or the document Gi.

Figure 8:
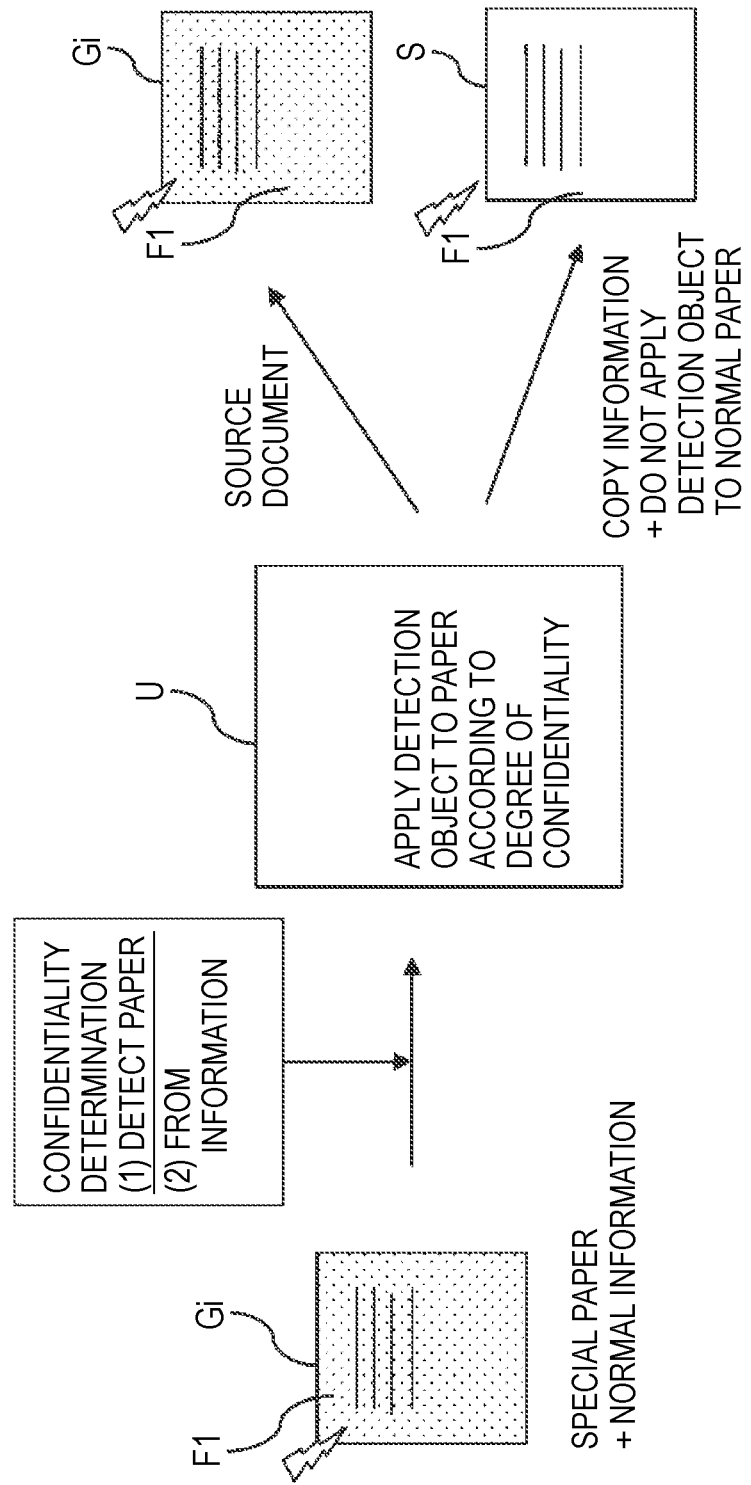
FIG. 8 is a diagram illustrating an outline of the confidential information processing performed by the image forming apparatus.

FIG. 8 is a diagram illustrating an outline of the confidential information processing performed by the image forming apparatus U. FIG. 8 illustrates an example in which the document Gi, which is a special paper applied with the detection object F1 but is not printed with information falling into confidential information, is copied by the image forming apparatus U.

In a case where the detection object F1 is applied to the document Gi but the confidential information 51 is not printed on the document Gi, the image forming apparatus U directly copies the content of the document Gi onto the sheet S. The image forming apparatus U does not apply the detection object to the sheet S.

As described above, the image forming apparatus U according to the present exemplary embodiment may control application of the detection object to the document Gi and to the sheet on which the content of the document Gi is copied based on whether the detection object is applied to the document Gi and based on the content printed on the document Gi. In the image forming apparatus U according to the present exemplary embodiment, in a case where confidential information is printed on the document Gi but the detection object is not applied to the document Gi, the detection object may be applied to the document Gi.

Even in a case where the detection object is not applied to the document Gi and the content read by the reading unit 110 does not include information falling into confidential information, in a case where the operator determines that confidential information is printed, the operator may set the document Gi as the document Gi including confidential information. For example, the operator may set the document Gi as the document Gi including confidential information by manual input using the input unit 15 of the image forming apparatus U such as an operation screen. According to the present exemplary embodiment, the detection object may be applied to the document Gi and the sheet S on which the content of the document Gi is copied.

The confidential information processing executed by the CPU reading software (program) in each of the above-described exemplary embodiments may be executed by various processors other than CPU. Examples of the processor in this case include a programmable logic device (PLD) whose circuit configuration can be changed after manufacture of a field-programmable gate array (FPGA) or the like, a dedicated electric circuit being a processor having a circuit configuration designed exclusively to execute specific processing such as an application specific integrated circuit (ASIC), and the like. In addition, the confidential information processing may be executed by one of the various processors, or may be executed by a combination of two or more processors of the same type or different types (for example, plural FPGAs, a combination of a CPU and an FPGA, or the like). More specifically, the hardware structures of these various processors are electric circuits in which circuit elements such as semiconductor elements are combined.

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in each of the above exemplary embodiments, an aspect in which the program of the confidential information processing is stored (installed) in the ROM or the storage in advance has been described, but the present invention is not limited thereto. The program may be provided in a form recorded in a non-transitory recording medium such as a compact disk read only memory (CD-ROM), a Digital versatile disk read only memory (DVD-ROM), and a universal serial bus (USB) memory. Alternatively, the program may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a reading device comprising:
      a reader configured to read a first recording medium; and
      an information acquirer configured to acquire information related to a detection object applied to the first recording medium;
   an image former configured to form an image on a second recording medium based on a content read by the reader of the reading device; and
   a detection object applicator configured to apply the detection object to the second recording medium on which the image is formed by the image former in a case where the content read by the reader includes confidential information, wherein
   the detection object applied to the second recording medium is selected from among different kinds of materials in accordance with a degree of confidentiality of the confidential information included in the first recording medium.

2. The image forming apparatus according to claim 1, wherein
   the information acquirer is configured to acquire the information related to the detection object by detecting the detection object in a non-contact manner with respect to the first recording medium.

3. The image forming apparatus according to claim 2, wherein
   the detection object detected by the information acquirer includes a material that absorbs or reflects at least a part of radio waves.

4. The image forming apparatus according to claim 2, wherein
   the detection object detected by the information acquirer includes a volatile material.

5. The image forming apparatus according to claim 2, wherein
   the detection object detected by the information acquirer includes a material that generates a magnetic force.

6. The image forming apparatus according to claim 1, wherein
   the information acquirer is configured to acquire the information related to the detection object based on input by an operator.

7. The image forming apparatus according to claim 1, further comprising:
   a display configured to present, in response to the information acquirer acquiring the information related to the detection object, that the first recording medium read by the reader includes the detection object.

8. The image forming apparatus according to claim 7, wherein
   the display is configured to present the information related to the detection object.

9. The image forming apparatus according to claim 1, wherein
   the different kinds of materials from among which the detection object is selected includes a material that generates a magnetic force, a material that absorbs or reflects at least a part of radio waves, and a volatile material to the second recording medium as the detection object.

10. The image forming apparatus according to claim 1, wherein,
    in a case where confidential information is included in the content read by the reader and no detection object is detected in the first recording medium, the detection object applicator applies the detection object to the first recording medium.

11. The image forming apparatus according to claim 1, wherein,
    in a case where no confidential information is included in the content read by the reader and the detection object is applied to the first recording medium, the detection object applicator does not apply the detection object to the first recording medium.

12. The image forming apparatus according to claim 1, further comprising:
    a function controller configured to control execution of a function of the image forming apparatus in a case where the content read by the reader includes confidential information.

* * * * *